(12) United States Patent
Rana et al.

(10) Patent No.: US 7,227,321 B1
(45) Date of Patent: Jun. 5, 2007

(54) SYSTEM AND METHOD FOR DETECTING BACK ELECTROMOTIVE FORCE WITH AUTOMATIC POLE CALIBRATION

(75) Inventors: Sakti Pada Rana, deceased, late of Singapore (SG); by Kuong Hoo, legal representative, Singapore (SG); Foo Leng Leong, Singapore (SG); Siew Yong Chui, Singapore (SG); Cheng Yong Toeh, Singapore (SG)

(73) Assignee: Marvell International Ltd., Hamilton (BM)

( * ) Notice: Subject to any disclaimer, the term of this patent is extended or adjusted under 35 U.S.C. 154(b) by 18 days.

(21) Appl. No.: 11/180,651

(22) Filed: Jul. 14, 2005

Related U.S. Application Data (60) Provisional application No. 60/651,880, filed on Feb. 9, 2005.

(51) Int. Cl.
*H02P 3/08* (2006.01)
*G11B 11/01* (2006.01)

(52) U.S. Cl. ............... 318/254; 318/439; 318/560; 360/75

(58) Field of Classification Search .......... 318/254, 318/439, 560, 561, 599; 360/75, 76
See application file for complete search history.

(56) References Cited

U.S. PATENT DOCUMENTS

| | | | | |
|---|---|---|---|---|
| 4,912,378 A * | 3/1990 | Vukosavic | .......... | 318/254 |
| 5,504,402 A * | 4/1996 | Menegoli | ............ | 318/377 |
| 5,572,096 A * | 11/1996 | Schlager | ............ | 318/254 |
| 5,672,948 A * | 9/1997 | Cohen et al. | ....... | 318/603 |
| 5,886,486 A * | 3/1999 | Jeong et al. | ........ | 318/254 |
| 6,081,112 A * | 6/2000 | Carobolante et al. | .... | 324/177 |
| 6,094,022 A * | 7/2000 | Schillaci et al. | ....... | 318/254 |
| 6,363,214 B1 * | 3/2002 | Merello et al. | ...... | 318/109 |
| 6,373,650 B1 * | 4/2002 | Pedrazzini | .......... | 360/75 |
| 6,392,375 B1 * | 5/2002 | Portaluri et al. | ....... | 318/459 |
| 6,463,211 B1 * | 10/2002 | Peritore et al. | ...... | 318/254 |
| 6,479,954 B1 * | 11/2002 | Peritore et al. | ...... | 318/254 |
| 6,498,446 B1 * | 12/2002 | Menegoli et al. | ..... | 318/254 |
| 6,542,324 B1 * | 4/2003 | Galbiati et al. | ....... | 360/75 |
| 6,570,360 B1 * | 5/2003 | Freeman | ........... | 318/798 |
| 6,600,618 B2 * | 7/2003 | Schlager | ............ | 360/75 |
| 6,611,118 B2 * | 8/2003 | Abe et al. | .......... | 318/254 |
| 6,631,045 B1 * | 10/2003 | Pedrazzini | .......... | 360/75 |
| 6,707,269 B2 * | 3/2004 | Tieu | ................ | 318/592 |
| 6,710,567 B2 * | 3/2004 | Heydt et al. | ........ | 318/560 |
| 6,864,656 B2 * | 3/2005 | Abe et al. | .......... | 318/560 |
| 6,967,458 B1 * | 11/2005 | Bennett et al. | ....... | 318/599 |
| 6,995,530 B2 * | 2/2006 | Biamonte et al. | ..... | 318/254 |
| 7,000,848 B2 * | 2/2006 | Busch | ............. | 236/49.3 |
| 2002/0141098 A1 * | 10/2002 | Schlager | ........... | 360/75 |
| 2003/0155896 A1 * | 8/2003 | Ezio et al. | ......... | 323/280 |
| 2004/0036436 A1 * | 2/2004 | Tieu | ................ | 318/439 |
| 2004/0037088 A1 * | 2/2004 | English | ............ | 362/545 |
| 2004/0184910 A1 * | 9/2004 | Busch | ............. | 415/13 |
| 2004/0223251 A1 * | 11/2004 | Ventura et al. | ........ | 360/75 |

(Continued)

*Primary Examiner*—Paul Ip (57) ABSTRACT

A system and method for determining the rotational speed of a motor, such as a three-phase disk drive motor, detects back electromotive force voltage generated during operation of the motor with an automatic pole calibration to minimize or eliminating variations in the wave of a freeze signal. A phase voltage at a winding is compared against a center tap (CT) voltage. Once the phase voltage falls to a specified voltage level, a detect signal is generated. A predetermined time after the detect signal is generated, a freeze signal is generated for freezing at least the circuit associated with the winding.

38 Claims, 6 Drawing Sheets

U.S. PATENT DOCUMENTS

2005/0099148 A1* 5/2005 DuLaney .................... 318/276
2005/0225272 A1* 10/2005 Wu et al. ................... 318/254
2005/0280382 A1* 12/2005 Viti ........................... 318/254

* cited by examiner

SYSTEM AND METHOD FOR DETECTING BACK ELECTROMOTIVE FORCE WITH AUTOMATIC POLE CALIBRATION

CROSS REFERENCE TO RELATED APPLICATIONS

This application claims priority under 35 U.S.C. §119(e) to U.S. Provisional Application Ser. No. 60/651,880, filed on Feb. 9, 2005, the disclosure of which is expressly incorporated by reference herein in its entirety.

BACKGROUND OF INVENTION

1. Field of Invention

The invention relates to a system and method for detecting electromotive force and, more particularly, to a system and method for detecting back electromotive force voltage in electric motors, such as disk drives, with an automatic pole calibration which can be used to sense the rotational speed of the motor or, in a disk drive, the speed of the media rotated by the motor.

2. Related Art

Motors used in disk drives, such as spindle motors, can be three phase motors which include a rotor having permanent magnets and a stator having windings for the three phases. Electrical current is passed through the windings to induce a magnetic field that interacts with the magnets or poles on the rotor, and causes the rotor to turn. Typically, at any particular time, two phases of the windings are driven, while the third phase is not driven. In disk drives, the rotor operates to turn a data media, such as a computer readable media, at high revolutions per minute (RPM). For proper operation of the disk drive, it is important to accurately sense the RPM of the media.

In the winding that is not powered, a back electromotive force ("BEMF") voltage having a sinusoidal waveform is generated by the magnets in the rotor. Specifically, as the permanent magnets pass by the windings, a current is induced in the winding. It may be desirable to detect the BEMF voltage to determine when the magnets of the rotor pass by the winding. Since the distance between the poles is known, the rotational speed of the rotor may be sensed from the BEMF detection.

Figure 1:
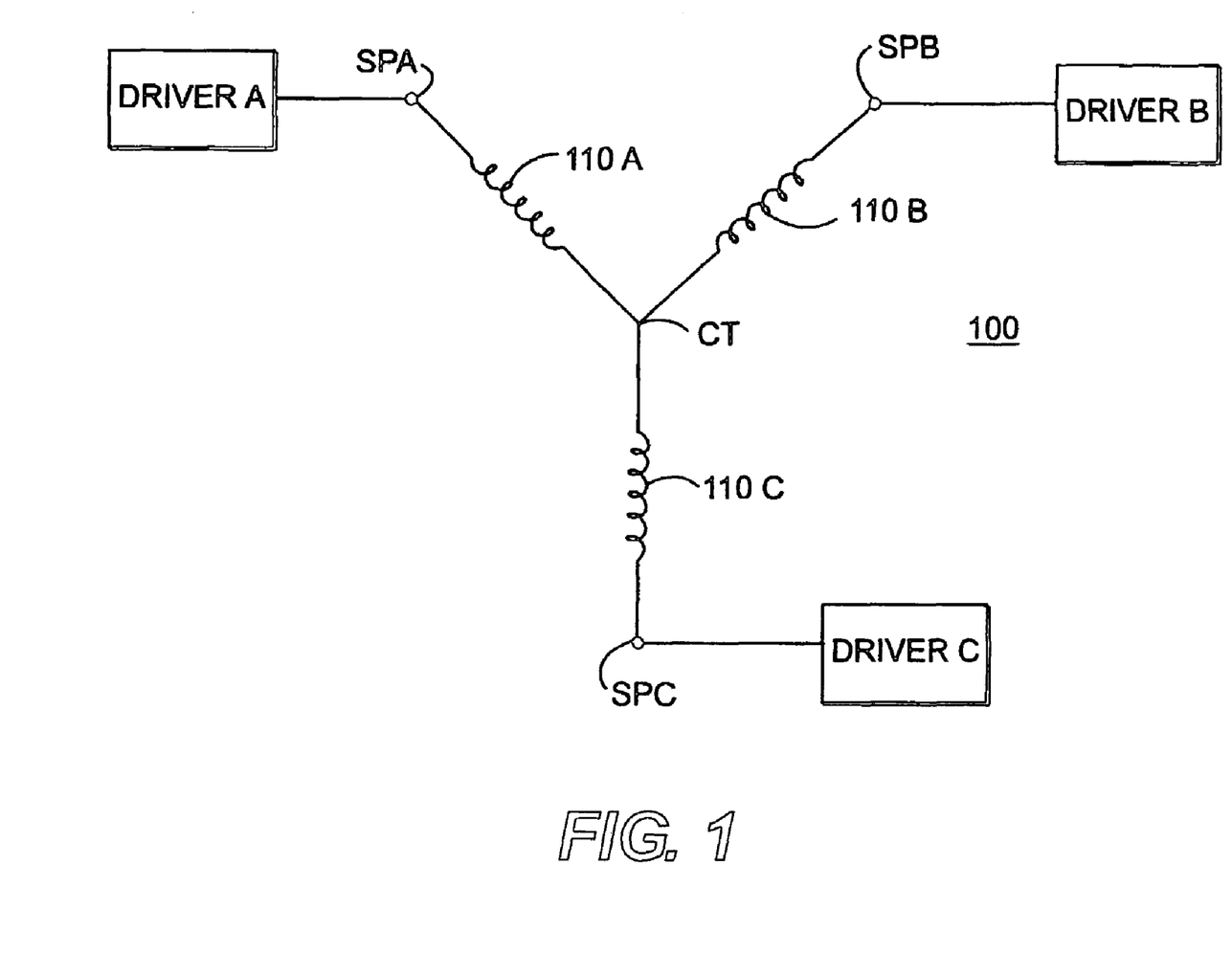
FIG. 1 is an electrical schematic of windings of a three-phase motor in which windings A, B, and C are connected at a center tap (CT)

The BEMF voltage (also referred to herein as "BEMF voltage event" or "BEMF event") is generated as an output of a comparator that compares the voltage at the centre tap (CT) of the motor and the voltage at one of the driving phases (e.g., phase A, B or C). By way of example, if the current is in a trapezoidal profile, the BEMF may be detected using one phase or three phases in one electrical cycle. If the current is in a sinusoidal profile, the BEMF may be detected using one phase, such as phase A. A schematic of the motor circuitry is shown in FIG. 1. The frequency of the signal generated based on the BEMF event is used to inform a hard disk controller, which can be implemented as a system on chip ("SOC"), of the rotational speed of the rotor and thus a disk or media rotated by the motor. Either the SOC or another component, such as a processor, may use this frequency to determine the rotational speed.

In order to detect this signal accurately and best reflect the RPM of the media, a freeze signal is generated before the BEMF event occurs. The freeze signal pulls the driving phase high to allow the BEMF event to be more easily detected without any switching noise in the associated motor circuitry. Components associated with one or more windings, such as the motor drivers, are pulled to a high voltage value to reduce or eliminate noise. Once the BEMF arrives, the freeze signal is released and the whole system will synchronize itself for the next BEMF.

Conventionally, a freeze signal has been generated using a forecast method. Based on the time of detection of the previous BEMF event, the system determines or estimates when the next BEMF event will occur. With this estimate, a window for the freeze signal is opened prior to the estimated occurrence of the BEMF event. This freeze signal is generated at a time based on a freeze register setting, such as at a serial port.

Figure 2:
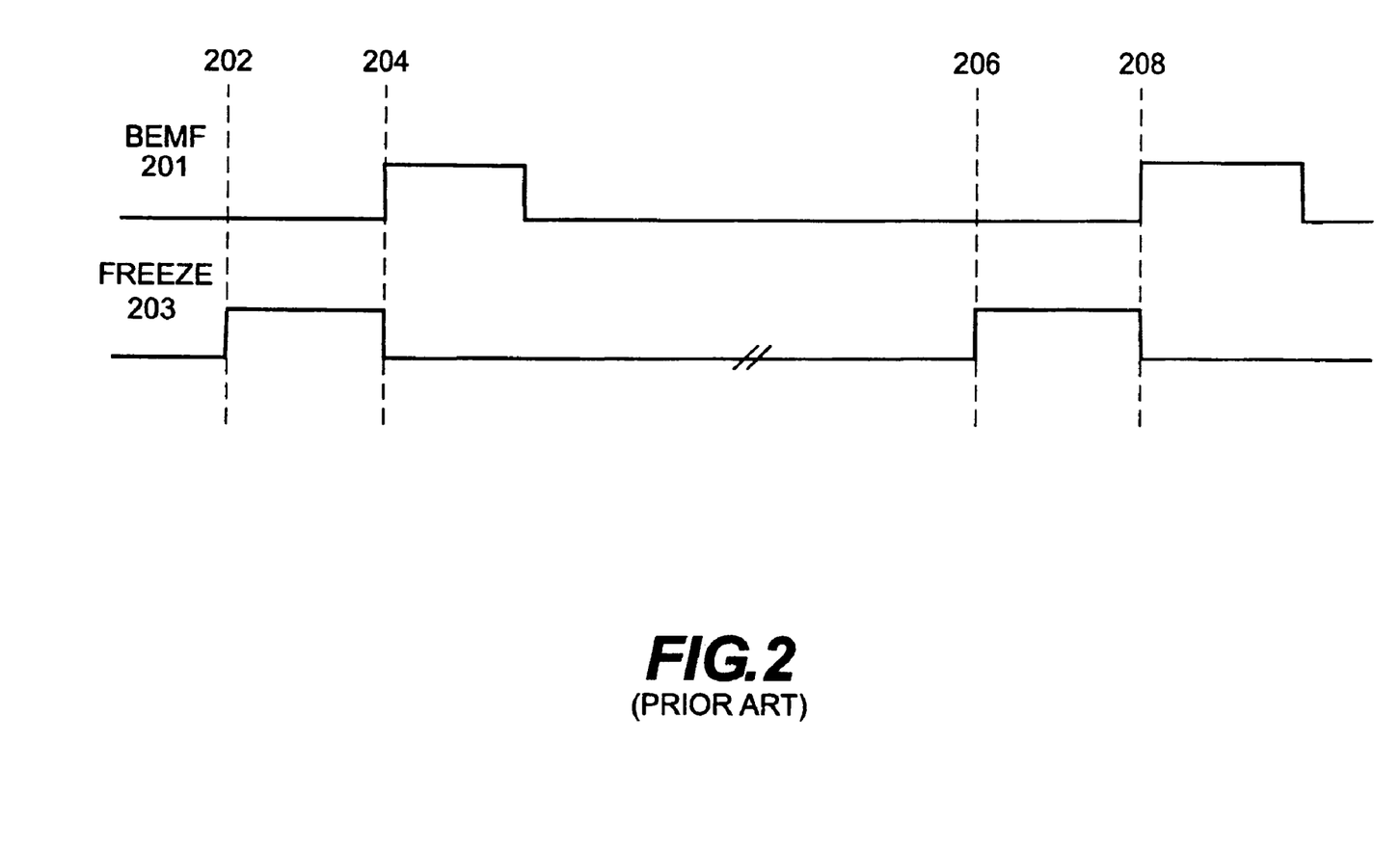
FIG. 2 is a waveform diagram of a back electromotive force signal and a freeze signal obtained according to a theoretical implementation of a BEMF detection system using the known forecast method.

FIG. 2 is a waveform diagram of a back electromotive force signal and a freeze signal according to a theoretical implementation of a detection system using the known forecast method. BEMF signal 201 and freeze signal 203 are compared in a time-wise fashion in FIG. 2. At time 202, the freeze signal is raised to high in anticipation of the BEMF voltage event, that is, when the BEMF signal moves to high. As described above, time 202 is determined based on an estimate of when the BEMF voltage event will occur using the previous occurrence of a BEMF event.

The BEMF voltage event occurs at time 204. The freeze signal is also turned off, or brought to low, at time 204. Based on the time 204, the freeze signal 203 moves to high at time 206. The timing of time 206 is based on the occurrence of the BEMF voltage event at time 204, as well as a register setting indicating a timing for generating the freeze signal 203. The BEMF voltage event occurs at time 208, while the freeze signal is also turned off.

This method of BEMF detection suffers from a number of deficiencies. One problem is that during the time period when the freeze signal is generated, the supply current will spike due to the freeze signal pulling the driver(s) to a high voltage level. This spiking will contribute to power consumption as well as noise in the chip. The longer the freeze signal is at high, the longer the spike and the more power consumed.

A further problem with this method arises because the poles for the motor that rotates the media may be unequally spaced apart from each other. This results in some differences between the expected position and the actual position of different poles. As the freeze register setting remains unchanged during the rotation, this difference in position will then translate into a longer or shorter time for the freeze signal to be at high. The freeze signal will be high based on the previous BEMF event, and will not change to a low voltage level until the BEMF event occurs, which may be earlier or later than initially estimated.

Figure 3:
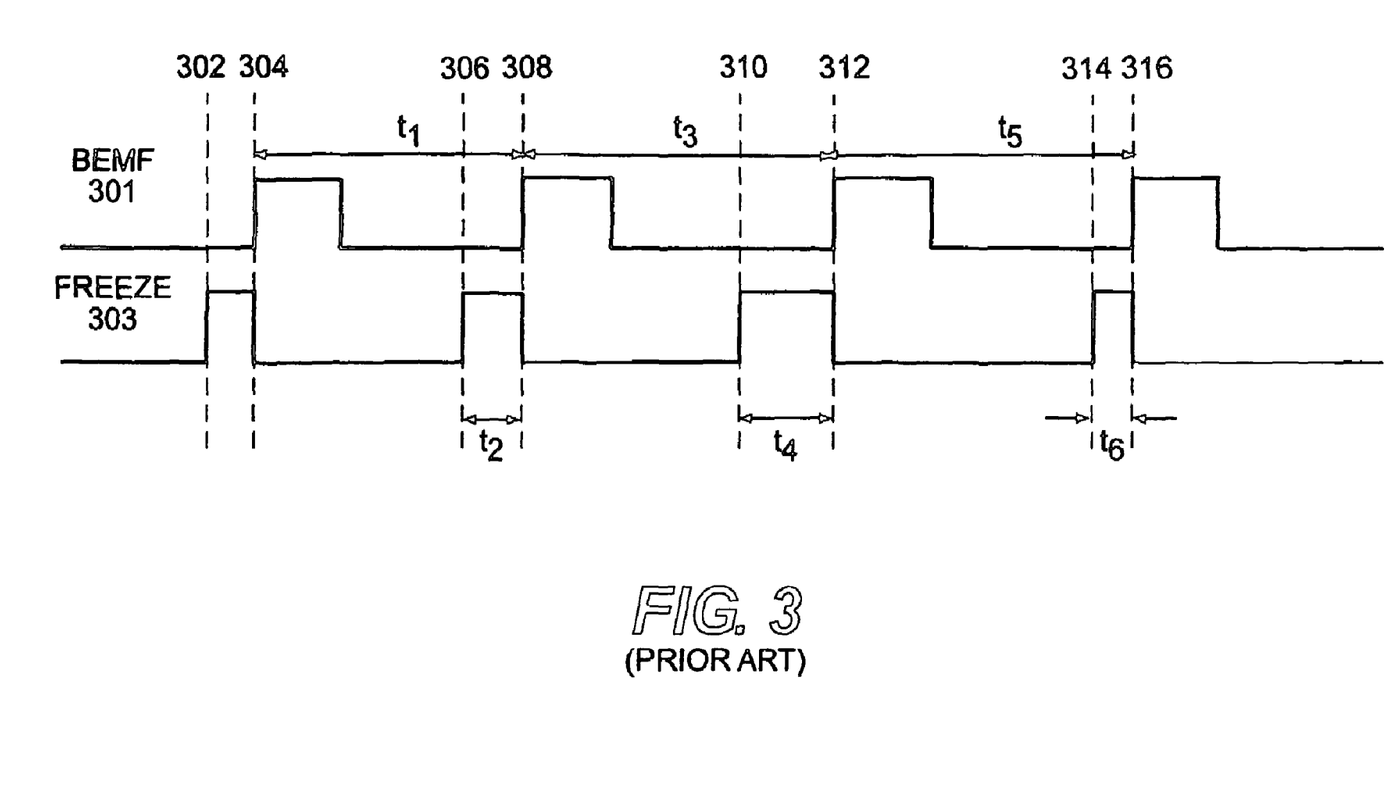
FIG. 3 is a waveform diagram of a back electromotive force signal and a freeze signal obtained when implementing the known forecast method in a motor having unequally spaced poles.

FIG. 3 is a waveform diagram of a back electromotive force signal and a freeze signal implementing the known forecast methods in a motor having unequally spaced poles. BEMF signal 301 and freeze signal 303 are compared in a time-wise fashion. At time 302, the freeze signal is generated in anticipation of the BEMF voltage event based on the previous BEMF event, that is, when the BEMF signal 301 moves to high. As described above, time 302 is determined based on an estimate of when the BEMF voltage event will occur.

The first BEMF voltage event occurs at time 304. The freeze signal is also turned off, or brought to low, at time 304. Based on this end time for the BEMF voltage event, the freeze signal 303 is generated at time 306. The timing of time 306 is based on the occurrence of the BEMF voltage event at time 304, as well as a register setting.

After the freeze signal is generated at time 306, the second BEMF voltage event occurs at time 308. The freeze signal is also turned off, or brought to low, at time 308. Again, based on the BEMF occurrence at time 308, the freeze signal 303 is generated at time 310. The timing of time 310 is based on the occurrence of the second BEMF voltage event at time 308, as well as a register setting. However, the third BEMF voltage event in this example does not occur until time 312 due to the pole arriving later than expected, at which time the freeze signal 303 is dropped to low. As the time ($t_3$) between the beginning of one BEMF event and the beginning of the next BEMF event (time 308 to time 312) is greater than the previous time ($t_1$) between the beginning of one BEMF event and the beginning of the next BEMF event (time 304 to time 308), the freeze signal may be left at high for a longer period of time ($t_4$) (time 310 to time 312) than the time ($t_2$) for the freeze signal from the previous BEMF event (time 306 to time 308).

Based on the BEMF occurrence at time 312, the freeze signal 303 is generated at time 314. However, in this example, the fourth BEMF voltage event occurs at time 316, at which point the freeze signal 303 is dropped low. As the time ($t_5$) between one BEMF event and another BEMF event (time 312 to time 316) is shorter than a previous time ($t_1$) between one BEMF event and the next BEMF event (time 304 to time 308), the freeze signal may be left at high for a shorter period of time ($t_6$) (time 314 to time 316) than either the previous two time intervals ($t_2$, $t_4$).

As described previously, a freeze signal that is too long may result in a current surge in the power supply, thereby draining the power supply. Further, a surge in current can cause the motor to accelerate, thereby increasing the speed of rotation. This can be problematic for some applications where the speed of the motor needs to be kept relatively constant, such as in disk drives. Further, when the durations of the freeze signals vary, the calculation of the location and speed of the motor varies. This may disrupt the proper use and/or functioning of the motor, which may require very precise operation, such as when used to rotate the data media in a disk drive.

Accordingly, there is a need for an improved BEMF detection system and method that minimizes or eliminates the drawbacks and disadvantages in prior BEMF detection schemes, and provides for more reliable operation accounting for unequal pole spacing.

SUMMARY OF THE INVENTION

The invention avoids the disadvantages and drawbacks of the prior art and/or satisfies the need for more accurately detecting back electromotive force voltage from a motor, such as a disk drive.

The invention thus provides a system and process for detecting back electromotive to detect poles in a motor while improving consistency and reducing the amount of time a freeze signal is used.

The advantages of the invention include the ability to control the width of the freeze signal more accurately, the speed control of the system may be improved and the width (time) of the freeze signal also may be minimized to a small value, thereby saving power as well as reducing acoustic noise. Advantages may also be achieved in the circuitry required to implement the BEMF detection methods of the invention as fewer gates and less silicon chip space are required than with prior known detection methods.

The invention may be implemented in a number of ways. According to one aspect of the invention, a method of detecting back electromotive force ("BEMF") voltage generated during operation of a motor having at least one winding receiving a variable driving voltage includes the step of comparing a first voltage based on the driving voltage to a second voltage based on a reference voltage. The method also includes the steps of generating an operation signal based on a predetermined difference between the driving voltage and the reference voltage to change the operative state of at least one component associated with the driving voltage for a predetermined period of time and of generating a BEMF signal based on the BEMF voltage after generation of the operation signal. At least one of the first voltage and the second voltage may be offset by a predetermined amount prior to the step of comparing, and the driving voltage may be a decreasing voltage. The operation signal may be generated independent of the BEMF voltage. The motor may be a rotatable multiple phase spindle motor of a disk drive, and the operation signal may be a freeze signal that switches to high an input associated with the driving voltage.

The BEMF signal may have a frequency, and the method may further include the step of determining a speed of the motor using the frequency of the BEMF voltage. The determined speed may be transmitted to a hard disk controller. The BEMF signal may be generated substantially at the same time as when the driving voltage equals the reference voltage, which may be substantially at the end of the predetermined time period. The method may include the step of generating a detect signal based on the comparison of the first voltage and the second voltage. The step of generating the operation signal may be responsive to a characteristic of the detect signal, which may be its magnitude. The operation signal may be generated at a predetermined time period, which may be adjustable, after the magnitude of the detect signal has changed. The detect signal may be generated based upon a predetermined difference between the driving voltage and the reference voltage, which difference may be adjustable. The method may also include at least one of the steps of controlling current in a first flow path from a voltage source to ground with at least the variable driving voltage to obtain the first voltage and controlling current in a second flow path from the voltage source to ground with at least the reference voltage to obtain the second voltage. Current may be added to at least one of the flow paths to change at least one of the first and second voltages.

According to another aspect of the invention, a circuit includes a comparator to receive a first voltage based on a variable drive voltage and a second voltage based on a reference voltage, and to output a detect signal based on a predetermined difference between the variable drive voltage and the reference voltage, an operation signal generator responsive to the detect signal to generate operation signals to change the operative state of at least one component associated with the drive voltage for a predetermined period of time, and a BEMF signal generator that generates a BEMF signal based on a BEMF voltage after the generation of the operation signal. At least one of the first voltage and the second voltage may be offset by a predetermined amount, and the drive voltage may be a decreasing voltage. The operation signal may be generated independent of the BEMF voltage. The circuit may be used in a rotatable multiple phase spindle motor of a disk drive having at least one winding associated with each phase, such as with a motor controller, and the operation signal may be a freeze signal that switches to high an input associated with at least one phase of the motor.

The BEMF signal may have a frequency, and the circuit may further include a processor that determines a speed of a component associated with the circuit using the frequency of the BEMF signal. The determined speed may be transmitted to a hard disk controller. The BEMF signal may be generated substantially at the same time as when the variable drive voltage equals the reference voltage, which may be substantially at the end of the predetermined time period. The circuit may also include a detect signal generator responsive to the comparison of the first voltage and the second voltage, and the operation signal generator may be responsive to a characteristic of the detect signal, such as its magnitude. The operation signal may be generated at a predetermined time period, which may be adjustable, after the magnitude of the detect signal has changed. The detect signal also may be generated based upon the predetermined difference between the drive voltage and the reference voltage, which difference may be adjustable. The at least one component may include a motor driver. The circuit may also include a first switch responsive to the drive voltage to control a first current flowing through a first resistor to ground and to obtain the first voltage, and a second switch responsive to the reference voltage to control a second current flowing through a second resistor to ground and to obtain the second voltage. A current device may add current to at least one of the first and second currents to change at least one of the first and second voltages.

According to another aspect of the invention, a circuit includes means, such as a comparator, for comparing a first voltage based on a variable drive voltage to a second voltage based on a reference voltage and outputting a detect signal based on a predetermined difference between the drive voltage and the reference voltage, means, such as a delay counter, for generating an operation signal responsive to the detect signal for changing the operative state of at least one component associated with the drive voltage for a predetermined period of time, and means, such as a comparator, for generating a BEMF signal based on a BEMF voltage after the operation signal is generated. At least one of the first voltage and the second voltage may be offset by a predetermined amount, and the drive voltage may be a decreasing voltage. The operation signal may be generated independent of the BEMF voltage. The circuit may be used in a rotatable three-phase spindle motor of a disk drive, such as with a motor controller, having at least one winding associated with each phase, and the operation signal may be a freeze signal that switches to high an input associated with at least one phase of the motor.

The BEMF signal may have a frequency, and the circuit may further include means, such as a processor, for determining a speed of a component associated with the circuit using the frequency of the BEMF signal. The determined speed may be transmitted to a hard disk controller. The BEMF signal may be generated substantially at the same time as when the drive voltage equals the reference voltage, which may be substantially at the end of the predetermined time period. The circuit also may include means for generating a detect signal, such as a comparator, responsive to the comparison of the first voltage and the second voltage, and the operation signal generating means may be responsive to a characteristic of the detect signal, which may be its magnitude. The operation signal may be generated at a predetermined time period, which may be adjustable, after the magnitude of the detect signal has changed. The detect signal may be generated when there is a predetermined difference, which may be adjustable, between the drive voltage and the reference voltage. The circuit may also include first means, such as a switch, responsive to the drive voltage, for controlling a first current flowing through a first resistor to ground and obtaining the first voltage, and second means, such as a switch, responsive to the reference voltage, for controlling a second current flowing through a second resistor to ground and obtaining the second voltage. Means for adding current, such as an offset device, may be provided to change at least one of the first and second voltages.

Additional features, advantages and embodiments of the invention may be set forth or apparent from consideration of the following detailed description, drawings and claims. Moreover, it is to be understood that both the foregoing summary of the invention and the following detailed description are exemplary and intended to provide further explanation without limiting the scope of the invention as claimed. For example, while the invention was developed to solve certain problems in three-phase disk drive motors, it may be used in other applications and with other devices or motors where detection of BEMF events is desirable.

BRIEF DESCRIPTION OF THE FIGURES

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings.

DETAILED DESCRIPTION OF THE INVENTION

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

A system and method are provided for detecting a BEMF voltage event while minimizing or eliminating variations in the wave of a freeze signal. According to an embodiment of the invention, a comparator is implemented to compare the phase voltage at a winding of a three-phase motor such as that shown in FIG. 1 against the center tap (CT) voltage (referred to herein as the "CT voltage" or the "CTAP voltage"). Once the phase voltage falls to within a specified predetermined amount of the CTAP voltage, the comparator will generate a detect signal. The predetermined amount may be a fixed value or a value that can be changed easily, such as by a register setting, and may be close to the CT voltage. Once the detect signal is generated, the freeze signal may be generated after another period of time determined by another register setting. The freeze signal may be used to freeze components associated with one or more windings, such as Driver A, Driver B, and/or Driver C, in one logic or operative state or position. Freezing the components may include turning one or more of the motor drivers to high.

Figure 4:
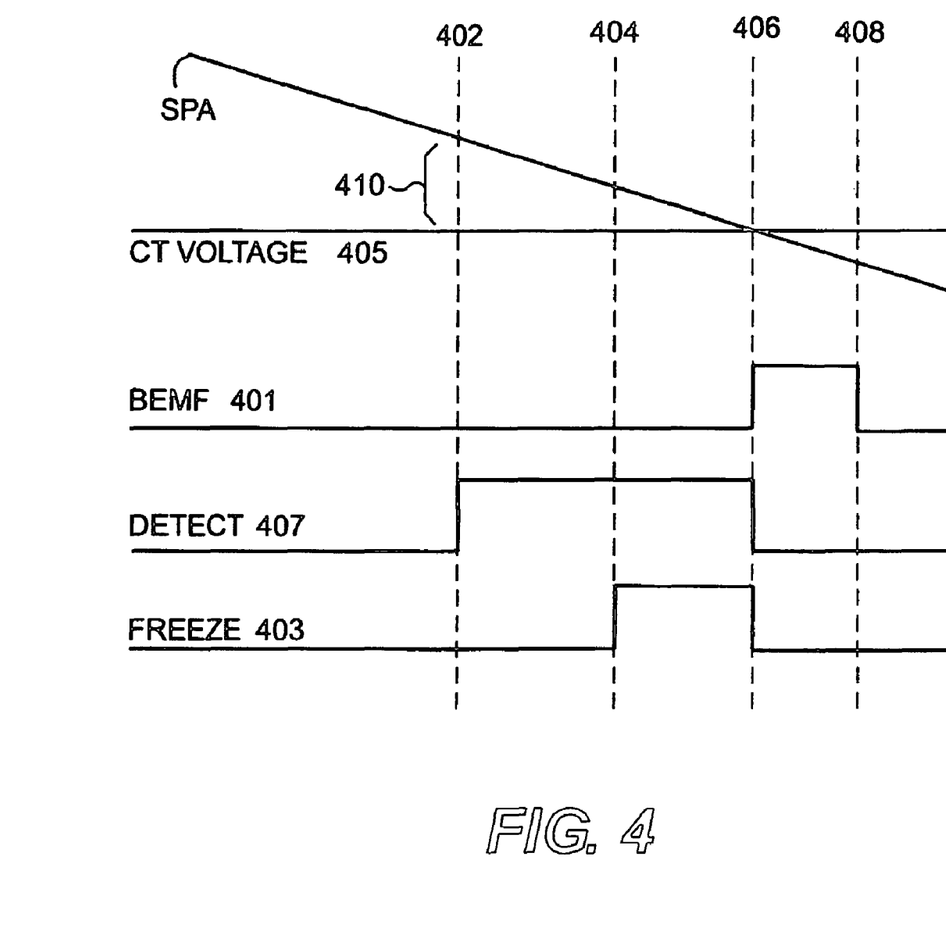
FIG. 4 is a waveform diagram of a phase voltage, a back electromotive force signal, a detect window and a freeze signal resulting from use of a BEMF detection system constructed according to principles of the invention.

FIG. 4 is a waveform diagram of a phase voltage SPA, a back electromotive force signal, a detect signal and a freeze signal resulting from use of a BEMF detection system constructed according to principles of the invention to sense BEMF events from a motor, such as shown in FIG. 1. The waveform diagram illustrates signal waveforms for the phase voltage SPA, the CT voltage 405, the BEMF voltage 401, the detect signal 407 and the freeze signal 403, which are compared in a time-wise fashion.

Phase voltage SPA is obtained from a winding of a motor such as the exemplary motor 100 schematically shown in FIG. 1. Motor 100 has phase windings 110A, 110B and 110C, where one end of each of the windings is joined at center tap point CT. The CT voltage is obtained from point CT. The phase voltage for each of the windings is obtained at the other end of the windings, such that voltage SPA is at the other end of the winding 110A, voltage SPB is obtained at the other end of the winding 110B and voltage SPC is obtained at the other end of winding 110C.

As illustrated in FIG. 4, the value of phase voltage SPA falls in comparison to the CT voltage 405. When the phase voltage SPA falls to within a predetermined offset amount 410 of CTAP voltage 405, a detect signal 407 is generated in detect window 407, as shown at time 402 in FIG. 4. At a predetermined time 404 after the raise in the detect signal 407 occurs at time 402, the freeze signal 403 is generated. The freeze signal 403 remains high until the BEMF voltage event occurs at time 406. The BEMF voltage occurs substantially when the phase voltage SPA reaches the level of CTAP voltage 405. At time 406, the detect signal 407 and the freeze signal 403 drop back to low. The predetermined voltage or time values may be held in registers and easily changed if desired.

The phase voltage SPA is substantially linear near the BEMF event. The SPA voltage will fall to within the predetermined offset amount 410 of the CT voltage 405 at essentially a predictable time prior to the onset of the BEMF voltage event, assuming a generally constant RPM of the motor. With this time known in advance, a delay amount may be selected to generate the freeze signal 403 at a predetermined amount of time before the BEMF event. This may allow the reduction or elimination of variation in the width of the freeze signal waveform. This consistency in the freeze signal waveform may provide improved speed control in the motor. Automatic pole calibration may also be facilitated through the principles of the invention. If the position of a pole is misaligned, the pre-detection may move together automatically with the pole position. In addition, the width of the freeze signal may be reduced and/or minimized to a small value to save power as well as lower acoustic noise. The circuit associated with the motor may also take up less space and result in silicon semiconductor chip wafer space savings, as this method generally requires less gates to implement as compared to known methods of freeze signal forecasting.

Figure 5:
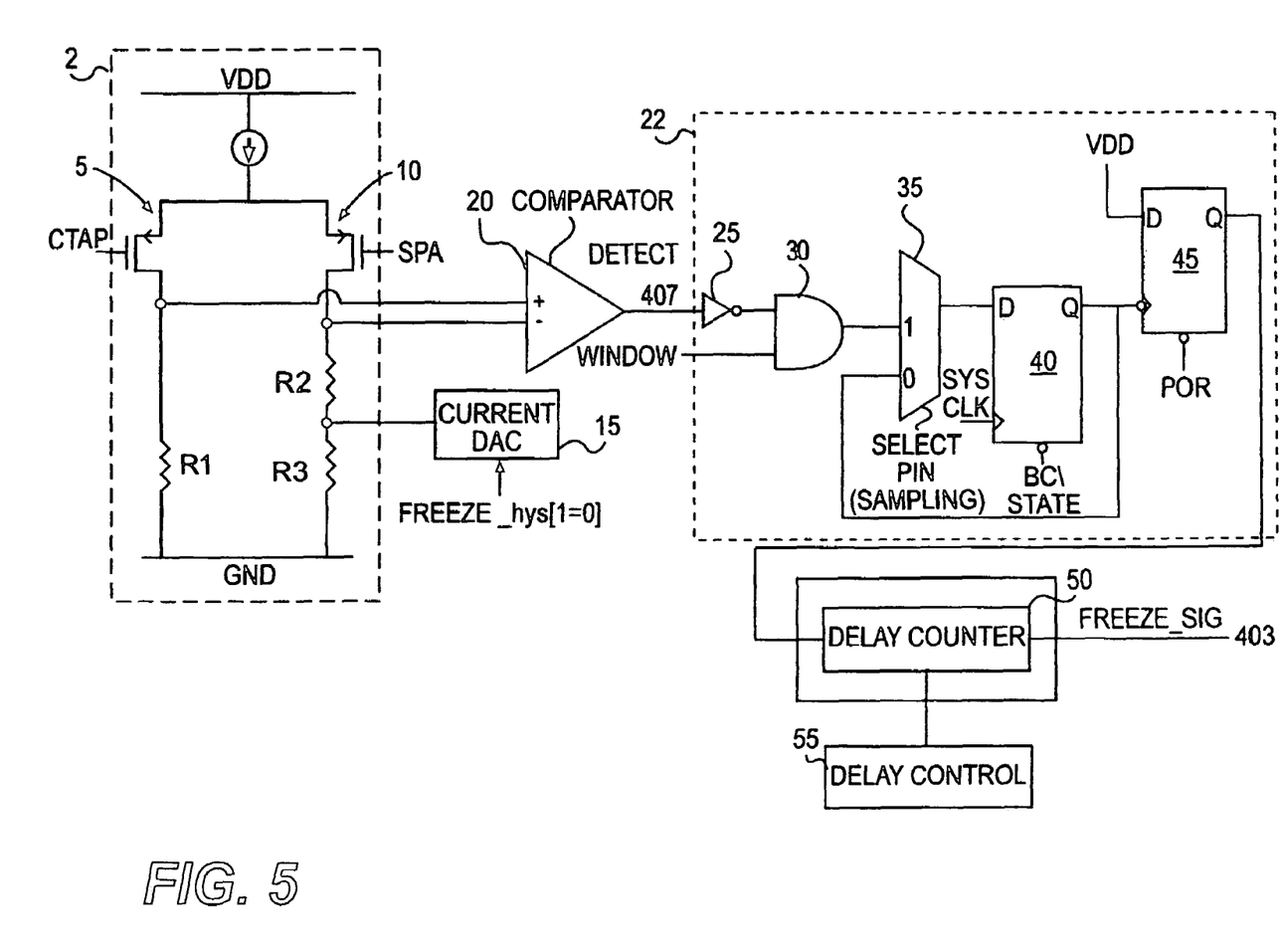
FIG. 5 is a diagram of a circuit constructed according to principles of the invention for generating a freeze signal that may be used in a BEMF detection system.

FIG. 5 is a diagram of a circuit constructed according to principles of the invention to control a freeze signal used in a BEMF detection system. A pre-amplifier 2 controls the inputs into comparator 20. The voltage at CTAP controls switch 5, while the voltage at SPA controls the switch 10. Switches 5 and 10 control the current flow from VDD to ground through the load resistors R1, and R2, R3, respectively, thereby increasing or decreasing the current flow through the respective switches. Comparator 20 compares a first voltage, which is the voltage difference from ground for the resistor R1 associated with switch 5, to a second voltage, which is the voltage difference from ground for the resistors R2, R3 associated with switch 10. While one or more resistors may be provided between each switch and ground, as shown, the overall resistor value associated with each switch may be the same. Accordingly, the current flows through the switches 5 and 10, which may be transistors acting as variable switches, and divides as appropriate to balance the current load. The amount of current flowing through switch 5 may vary based on the CTAP voltage, while the amount of current flowing through switch 10 may vary based on the SPA voltage. Thus, the voltages received at comparator 20 vary based on the control of switch 5 by the CTAP voltage and the control of switch 10 by the SPA voltage.

An offset device 15 changes the current in the resistors R2, R3 associated with switch 10, which is responsive to the SPA voltage. Because the resistors R1, and R2, R3 are balanced, the current added by the offset device 15 alters the current flowing from VDD through both switch 5 and switch 10, and thus alters the voltages received by comparator 20. The amount of current supplied by offset device 15 causes an offset in the voltage at the resistor associated with switch 10 compared with the voltage that would be present without the additional current. FIG. 5 illustrates offset device 15 as a current digital to analog converter (current DAC), where the offset amount is controlled by a freeze hysteresis signal. The offset device 15 is responsive to a control signal that may be based on the hysteresis characteristics of the circuit. The control signal may be provided by the SOC and may be adjusted based on the performance requirements of the environment where the circuit is used. For example, when used in a disk drive environment, the user may adjust the offset depending upon the form factor of the disk drive. The amount of current supplied by the offset device 15 may be based on the magnitude of voltage used to drive the motor. The offset device 15 provides a current that may raise or lower the voltage across the resistors R2, R3 associated with switch 10. However, it is understood that offset device 15 may also be used to introduce current to the resistor R1 associated with switch 5. Although resistors R1, R2 and R3 are shown, it is also understood that additional resistors or fewer resistors may also be used, and/or one or more of the resistors R1, R2, R3 may be adjustable.

Comparator 20 compares the voltages received from the pre-amplifier 2. When the voltage associated with switch 10, which is controlled by the SPA voltage, is greater than or equal to the voltage associated with switch 5, which is controlled by the CTAP voltage 405, comparator 20 provides an output at a first state. When the voltage associated with switch 10 falls below the voltage associated with switch 5, comparator 20 generates an output at a second state. As described previously with respect to FIG. 4, the output of comparator 20 is illustrated as detect signal 407. The first state may be a logical low and the second state may be a logical high.

The output voltage of the comparator 20 may be received at a postprocessor 22 to characterize the digital signals in desired ways. While FIG. 5 illustrates a particular postprocessor unit, it is understood that other types of post processing may be used within the principles of the invention. In FIG. 5, postprocessor 22 includes an inverter 25 that inverts the detect signal received from comparator 20. An AND gate 30 receives the inverted signal and also receives a window signal. The window signal may be generated based on the system clock and may be provided by the SOC to work with the AND gate 30 to control when the inverted detect signal is passed to other components.

A multiplexer 35 receives the signal from the AND gate 30. The output of multiplexer 35 is received at a delay register 40. The output of delay register 40 is fed back to the multiplexer 35. A sampling signal controls the multiplexer 35 to either hold a signal value at the output of the multiplexer 35 or change the value based on a signal received from the AND gate 30. The sampling signal may be similar to the window signal, and may be provided by the SOC. The sampling signal works with the multiplexer 35 to control when the signal is passed to other components. Delay register 40 holds the signal received from the multiplexer 35 through one or more clock cycles. A BC/State signal controls the delay register 40, and may be similar to the window signal and provided by the SOC.

The output of delay register 40 is received at hold register 45. When the signal received from delay register 40 changes, the output of hold register 45 may change at the next clock cycle. The hold register 45 may be controlled by a power on reset (POR) signal. The registers 40, 45 may be flip-flops or other suitable circuits or logic components.

The output of postprocessor 22 from hold register 45 is received at a delay counter 50. The delay counter 50 receives from delay control 55 a setting designating the amount of time to delay before outputting a freeze signal 403. Delay counter 50 may have a control input to receive the time delay amount from delay controller 55. The time delay amount may be a predetermined amount stored in delay controller 55, or may be programmable and/or adjustable. For example, an SOC may change the delay amount stored in delay controller 55, such as in response to feedback received from other components of the SOC and/or disk drive.

Figure 6:
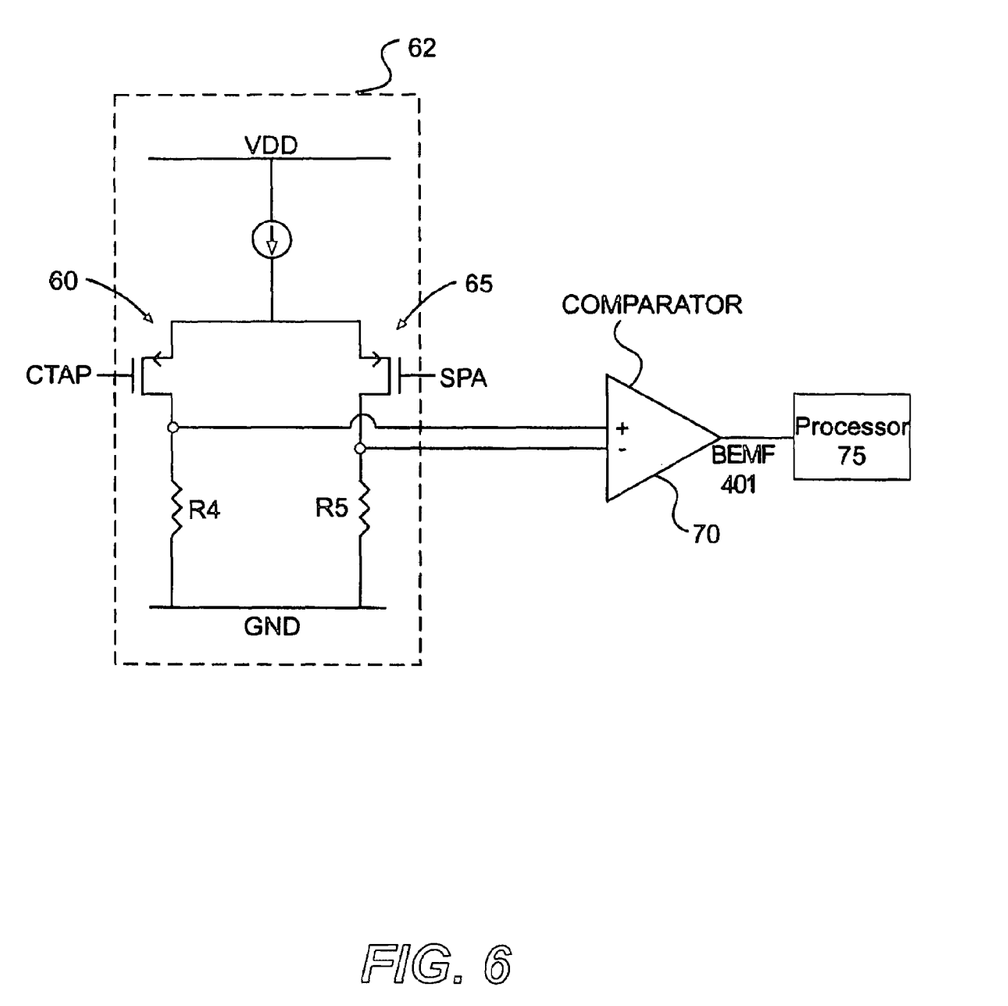
FIG. 6 is a diagram of a circuit constructed according to principles of the invention for generating a signal based on a BEMF event.

FIG. 6 is a diagram of a circuit constructed according to principles of the invention for generating a signal based on a BEMF event. The BEMF signal 401 may be generated by comparing the SPA voltage to the CTAP, using comparator 70. The BEMF event is detected from the windings, such as winding 110A in FIG. 1. As shown, a pre-amplifier 62 controls the inputs into comparator 70. The voltage at CTAP controls switch 60, while the voltage at SPA controls the switch 65. Switches 60 and 65 control the current flow from VDD to ground through the load resistors R4, R5, respectively, thereby increasing or decreasing the current flow through the respective switches. As the overall resistor value associated with each switch may be the same, the current flows through the switches 60 and 65, which may be transistors, and divides as appropriate to balance the current load. Thus, the voltages received and compared by comparator 70 vary based on the control of switch 60 by the CTAP voltage and the control of switch 65 by the SPA voltage. The comparator 70 generates the BEMF signal 401, which may be sent to a processor 75, such as associated with a controller or SOC. The comparator 70 may change its output from a first state to a second state based on the occurrence of a BEMF event. As described previously with respect to FIG. 4, the first state may be a logical high and the second state may be a logical low. Pre-amplifier 62 may be substantially the same as pre-amplifier 2, but without an offset device 15.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention. For example, while FIG. 5 illustrates an exemplary circuit constructed according to principles of the invention, it is understood that other circuit configurations also may be used. For example, it may be desirable to shift the CTAP voltage by the threshold amount 410. In doing so, offset device 15 may adjust the CTAP voltage. The adjusted voltage output could then be compared to the SPA voltage by comparator 20. In addition, while various signals have been shown in FIGS. 2, 3 and 4 as being generated by raising the voltage from low to high, it is understood that other signals, such as lowering from high to low, also may be used to implement the invention. Further, various outputs and signals from the BEMF detection system may be used in other aspects of a circuit or circuits associated with a motor, such as a motor for a disk drive.

What is claimed is:

1. A method of detecting back electromotive force ("BEMF") generated during operation of a motor having at least one winding receiving a variable driving voltage, said method comprising the steps of:
   comparing a first voltage based on the variable driving voltage to a second voltage based on a reference voltage to generate a detect signal;
   generating an operation signal based on the detect signal to change the operative state of at least one component of a circuit associated with the driving voltage for a predetermined period of time; and
   generating a BEMF signal based on a BEMF voltage after generation of the operation signal.

2. The method of claim 1, wherein at least one of the first voltage and the second voltage is offset by a predetermined amount prior to the step of comparing.

3. The method of claim 1, wherein the driving voltage is a decreasing voltage.

4. The method of claim 1, wherein the BEMF signal has a frequency, and further comprising the step of determining a speed of the motor using the frequency of the BEMF voltage.

5. The method of claim 4, wherein the determined speed is transmitted to a hard disk controller.

6. The method of claim 1, wherein the BEMF signal is generated substantially at the same time as when the driving voltage equals the reference voltage.

7. The method of claim 1, wherein the BEMF signal is generated substantially at the end of the predetermined time period.

8. The method of claim 1, wherein the detect signal is based upon a predetermined difference between the driving voltage and the reference voltage, and wherein the step of generating the operation signal is responsive to a characteristic of the detect signal.

9. The method of claim 8, wherein the detect signal is generated based upon the predetermined difference between the driving voltage and the reference voltage.

10. The method of claim 9, wherein the predetermined difference is adjustable.

11. The method of claim 9, wherein the characteristic of the detect signal is its magnitude and the operation signal is generated at a predetermined time period after the magnitude of the detect signal has changed.

12. The method of claim 11, wherein the predetermined time period is adjustable.

13. The method of claim 1, wherein the motor is a rotatable multiple phase spindle motor of a disk drive.

14. The method of claim 13, wherein the operation signal is a freeze signal that switches an input associated with the driving voltage to high.

15. The method of claim 1, wherein the operation signal is generated independent of the BEMF voltage.

16. The method of claim 1, further comprising at least one of the following steps:
   controlling current in a first flow path from a voltage source to ground with at least the variable driving voltage to obtain the first voltage; and
   controlling current in a second flow path from the voltage source to ground with at least the reference voltage to obtain the second voltage.

17. The method of claim 16, further comprising the step of adding current to at least one of the flow paths to change at least one of the first and second voltages.

18. A circuit comprising:
   a comparator to receive a first voltage based on a variable drive voltage and a second voltage based on a reference voltage, and to output a detect signal based on a predetermined difference between the variable drive voltage and the reference voltage;
   an operation signal generator responsive to the detect signal to generate operation signals to change the operative state of at least one component associated with the drive voltage for a predetermined period of time; and
   a BEMF signal generator that generates a BEMF signal based on a BEMF voltage after the generation of the operation signal.

19. The circuit of claim 18, wherein at least one of the first voltage and the second voltage is offset by a predetermined amount.

20. The circuit of claim 18, wherein the drive voltage is a decreasing voltage.

21. The circuit of claim 18, wherein the BEMF signal has a frequency, and further comprising a processor that determines a speed of a component associated with said circuit using the frequency of the BEMF signal.

22. The circuit of claim 21, wherein the determined speed is transmitted to a hard disk controller.

23. The circuit of claim 18, wherein the BEMF signal is generated substantially at the same time as when the variable drive voltage equals the reference voltage.

24. The circuit of claim 18, wherein the BEMF signal is generated substantially at the end of the predetermined time period.

25. The circuit of claim 18, further comprising a detect signal generator responsive to the comparison of the first voltage and the second voltage, and wherein the operation signal generator is responsive to a characteristic of the detect signal.

26. The circuit of claim 25, wherein the detect signal is generated based upon the predetermined difference between the drive voltage and the reference voltage.

27. The circuit of claim 26, wherein the predetermined difference is adjustable.

28. The circuit of claim 26, wherein the characteristic of the detect signal is its magnitude and the operation signal is generated at a predetermined time period after the magnitude of the detect signal has changed.

29. The circuit of claim 28, wherein the predetermined time period is adjustable.

30. The circuit of claim 18, further comprising a rotatable multiple phase spindle motor of a disk drive having at least one winding associated with each phase.

31. The circuit of claim 30, wherein the operation signal is a freeze signal that switches an input associated with at least one phase of the motor to high.

32. The circuit of claim 18, further comprising a motor drive controller.

33. The circuit of claim 18, further comprising a disk drive.

34. The circuit of claim 18, wherein the operation signal is generated independent of the BEMF voltage.

35. The circuit of claim 18, wherein said at least one component includes a motor driver.

36. The circuit of claim 18, further comprising at least one of:
   a first switch responsive to the drive voltage to control a first current flowing through a first resistor to ground and to obtain the first voltage; and
   a second switch responsive to the reference voltage to control a second current flowing through a second resistor to ground and to obtain the second voltage.

37. The circuit of claim 36, further comprising a current device to add current to at least one of the first and second currents to change at least one of the first and second voltages.

38. A circuit comprising:
   means for comparing a first voltage based on a variable drive voltage to a second voltage based on a reference voltage and outputting a detect signal based on a predetermined difference between the drive voltage and the reference voltage;
   means for generating an operation signal responsive to the detect signal to change the operation state of at least one component associated with the drive voltage for a predetermined period of time; and
   means for generating a BEMF signal based on a BEMF voltage after the operation signal is generated.

* * * * *

UNITED STATES PATENT AND TRADEMARK OFFICE
CERTIFICATE OF CORRECTION

PATENT NO. : 7,227,321 B1 Page 1 of 1
APPLICATION NO. : 11/180651
DATED : June 5, 2007
INVENTOR(S) : Sakti P. Rana et al.

It is certified that error appears in the above-identified patent and that said Letters Patent is hereby corrected as shown below:

Title Page, Item (75) Inventors: please correct "Cheng Yong Toeh.," to -- Cheng Yong Teoh --

Signed and Sealed this

Fourth Day of November, 2008

JON W. DUDAS
*Director of the United States Patent and Trademark Office*